D. H. FANNING.

Corset.

No. 8,493. Reissued Nov. 19, 1878.

Witnesses.

L. F. Connor

E. C. Whitney

Inventor.

David H. Fanning.

by Crosby & Gregory Atty

N. PETERS, PHOTO-LITHOGRAPHER, WASHINGTON, D. C.

UNITED STATES PATENT OFFICE.

DAVID H. FANNING, OF WORCESTER, MASSACHUSETTS.

IMPROVEMENT IN CORSETS.

Specification forming part of Letters Patent No. 199,277, dated January 15, 1878; Reissue No. 8,493, dated November 19, 1878; application filed October 28, 1878.

*To all whom it may concern:*

Be it known that I, DAVID H. FANNING, of Worcester, in the county of Worcester and State of Massachusetts, have invented an Improved Corset, of which the following is a specification:

This invention relates to corsets, and has special reference to the method of applying and using the steels at the front thereof, to insure stiffness and prevent the liability of the steels being broken.

Figure 1:
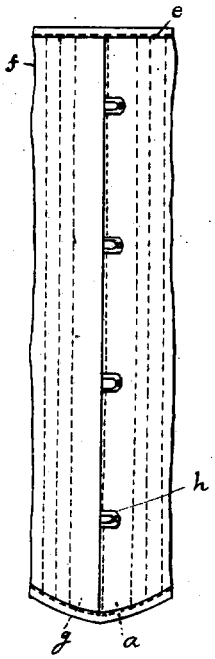
Figure 3:
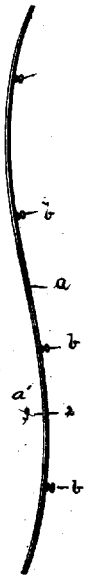
Figure 2:
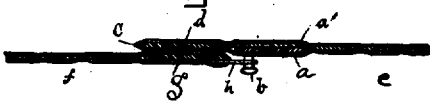

Figure 1 represents a sufficient portion of the front of a corset to illustrate my invention; Fig. 2, a cross-section of Fig. 1 enlarged, and Fig. 3 a side elevation of that portion of the steel provided with the studs or pins.

The majority of corsets now made are provided at the front, one half with a steel having pins, and the other half with a steel having eyes to fit over the pins, and when hooked together the steels rest edge to edge.

Other steels have been made, one broader than the other, so that one could lap over the other when hooked together; and other steels at each edge of the corset-front have been strengthened for a portion of their length by the application of a second shorter steel.

In this my invention the steel *a*, from which the hooks or pins *b* project, is stitched into the corset somewhat back from the front edge thereof, as shown in Fig. 2, and then between said steel *a* and the edge *c* of the corset is stitched a second narrow steel, *d*, thus providing one half, *e*, of the corset with two steels placed edge to edge, with a seam between them. At the front edge of the other half, *f*, of the corset I place a single steel, *g*, having eye-pieces *h*, all as usual, to engage the hooks or studs *b*.

I have shown a second steel, *a'*, located directly below steel *a*, and of the same width, to thereby add to the stiffness of the corset.

When the corset is secured about the person its front edges are caused to overlap, as shown in Fig. 2, where the single steel *g* is shown as overlapping the single steel *d*, the eyes *h* engaging the studs *b* of the steel *a*, which is shown placed above a steel, *a'*, thus making at the front of the corset, for the purpose of stiffening it, two double thicknesses of steel.

It is obvious that the steels applied in this way will be stronger and less liable to break than are the common single steels; and by placing the single steel *d* at the side of the double steel *a a'*, (the two steels *d a* being connected by a flexible hinge in this instance of my invention, the cloth forming the outer and inner faces of the corset,) the steel *d* is permitted to move independently of steel *a*, and is made much more comfortable to the wearer than would be the case were the two steels *d a* made as one single wide steel.

It is obvious that instead of two steels, *a a'*, I might employ a single steel thicker than the steel *d*. These steels may be applied to any usual form of corset.

I claim—

1. A corset one half of which is provided with a single steel, *g*, having eyes *h*, combined with the other half of the corset, provided with two steels, *d a*, placed edge to edge, the steel *a* most remote from the edge being provided with pins to co-operate with the eyes *h*, the steel *g* overlapping the steel *d*, substantially as shown and described.

2. In a corset, two single steels, *g d*, one at each edge of each half of the corset, and a double or stiffer steel, *a a'*, placed next the edge of the said single steel *d*, but farther back from the edge of the corset, the single steel *g* at one edge of the corset being provided with eyes, and the steel *a* located back from the edge of the corset and above the steel *a'* with studs, whereby the two single steels *g d* at the extreme edges of the corset, when the corset is hooked together at the front, will fall the one over the other and alongside of the double steel, the connection between the two steels *a b* at one edge of the corset being flexible, to operate substantially as described.

DAVID H. FANNING.

Witnesses:

G. W. GREGORY,

N. E. WHITNEY.